Patented Mar. 28, 1939

2,152,480

UNITED STATES PATENT OFFICE 2,152,480

COMPOUNDS OF THE ANTHRAQUINONE SERIES

Heinrich Hopff, Helmut Eichel, and Adolf Diebold, Ludwigshafen-on-the-Rhine, Germany, assignors to General Aniline Works, Inc., New York, N. Y., a corporation of Delaware No Drawing. Application November 3, 1937, Serial No. 172,590. In Germany November 4, 1936

5 Claims. (Cl. 260—377)

The present invention relates to compounds of the anthraquinone series and a process of producing them.

We have found that vinyl ketones may be added on to aminoanthraquinones with the formation of new compounds of the anthraquinone series. The reaction probably proceeds according to the following example

R being an aliphatic, cycloaliphatic or aromatic radicle and A the radicle of an anthraquinone or a compound derived from anthraquinone by the addition of a ring, as for example a benzanthrone, anthrapyridone, anthrapyrimidine or anthraquinoneoxazole.

Suitable vinyl ketones are for example vinyl methyl ketone, vinyl ethyl ketone and vinyl phenyl ketone. Instead of these there may also be used the beta-halogenethyl ketones derived therefrom by the adding on of hydrogen halides, as for example beta-chlorethyl methyl ketone. The vinyl ketone may be introduced one or more times depending on the number of amino groups in the initial material.

The reaction is preferably carried out by heating the vinyl ketone with the amino compounds; diluents may also be used if desired. When a compound derived by the addition of hydrogen halide to the vinyl ketone is used, it is advantageous to carry out the reaction in the presence of agents capable of binding hydrogen halide such as pyridine or dimethylaniline. When using vinyl ketones of low boiling point, such as methyl vinyl ketone, the reaction is preferably allowed to proceed in a closed vessel under increased pressure.

Instead of vinyl methyl ketone, vinylacetylene may be caused to act in the presence of water on aminoanthraquinones provided conditions are chosen under which vinyl methyl ketone can form.

For example the aminoanthraquinone is dissolved in a suitable solvent with the addition of water, a substance is added which promotes the adding on of water to vinylacetylene such as mercury and mercury compounds, copper, silver and their compounds and the mixture is heated while leading in vinyl acetylene until the reaction is completed. As solvents there may be mentioned in particular water-soluble compounds, as for example alcohols or sulphuric or other mineral acids. The reaction takes place even with gentle heating, as for example at from 30° to 50° C. and is completed after a short time.

The adding on of the vinyl ketone is rendered evident by a marked deepening of the color of the reaction mixture. The substances formed usually separate in a crystalline form by cooling.

We have further found that also other compounds containing a CO-group in an adjacent position to a double linkage can be added on to amino derivatives of the anthraquinone series. Examples of compounds having a CO-group in adjacent position to a double linkage are acrolein, crotonaldehyde and citral. There may be mentioned for example 1-aminoanthraquinone, 1,4-diamino-anthraquinone, 1,4,5,8-tetraminoanthraquinone, 1,4-diamino-5-hydroxyanthraquinone, 1-amino-4-methoxyanthraquinone, aminobenzanthrones, aminoanthrapyridones, aminoanthrapyrimidines, aminoanthraquinone-oxazoles and other amino derivatives of the anthraquinone series which contain attached rings, for example in the 1,9-, 1,2- or 2,3-positions.

The said unsaturated compounds may enter in the molecule one or more times depending on the number of free amino groups.

The reaction may be carried out in the manner described above. Diluents may be co-employed, as for example alcohols. In many cases it is advantageous to carry out the reaction in a closed vessel under pressure. An addition of assistants, such as piperidine or chloracetic acid, is sometimes advantageous.

The progress of the reaction also in this case may be recognized by a marked deepening in the color. The final products usually separate in crystalline form when the mixture is cooled.

The processes described above may be carried out with special advantage in the presence of moderately diluted mineral acids. The final products then separate in a crystallized form and in an excellent yield merely by diluting the reaction mixture with water. They may be directly used in this form.

Some of the dyestuffs obtained may be used for dyeing cellulose esters and ethers or as initial materials for the preparation of dyestuffs. By strong heating and/or treatment with alkaline agents which split off water they may in many cases, in a similar manner to that occurring in the reaction of acetone on 1-aminoanthraquinone, be converted into anthrapyridones in the following manner:

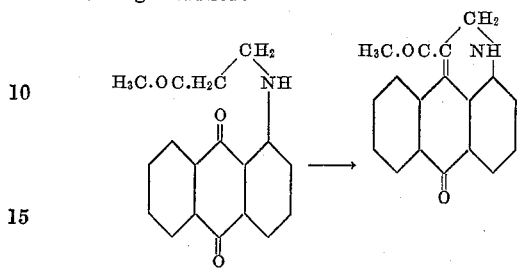

This ring closure is detected by the fact that the solutions of the substances in strong sulphuric acid have often a powerful fluorescence.

The following examples will further illustrate how the said invention may be carried out in practice but the invention is not restricted to these examples. The parts are by weight.

*Example 1*

120 parts of 1-chlorbutyrone(3) (beta-chlorethyl methyl ketone, obtainable by leading hydrogen chloride gas into cooled vinyl methyl ketone, in the calculated yield) are dropped into a solution of 223 parts of 1-amino-anthraquinone in 1200 parts of hot pyridine. The mixture is heated to boiling for 3 hours and then cooled whereby a part of the resulting gamma-ketobutyl-1-aminoanthraquinone separates in the form of dark red crystals. By evaporation, the remainder may be recovered. The compound dyes acetate silk red shades.

*Example 2*

A mixture of 223 parts of 1-aminoanthraquinone, 800 parts of ethanol and 100 parts of vinyl methyl ketone is heated for 20 hours at 150° C. in a pressure-tight vessel in the presence of 1 part of hydroquinone (which increases the stability of the ketone). The whole is then allowed to cool and the compound formed is separated off. It is identical with the gamma-ketobutyl-1-aminoanthraquinone described in example 1.

Instead of the mixture of ethanol and hydroquinone, there may also be used with advantage the same amount of pyridine.

*Example 3*

250 parts of 1-chlorbutyrone(3) are dropped into a solution of 238 parts of 1,4-diaminoanthraquinone in 1500 parts of hot pyridine. After heating for five hours, the reaction is completed. By cooling, 1,4-di-(gamma-ketobutyl-amino)-anthraquinone separates out. It dyes acetate artificial silk pure blue shades.

Instead of with 1-chlorbutyrone(3), the reaction may also be carried out in the presence of ethanol and hydroquinone or of pyridine with vinyl methyl ketone (see Example 2).

When 1,5-diaminoanthraquinone is used instead of 1,4-diaminoanthraquinone, 1,5-di-(gamma-ketobutylamino)-anthraquinone is obtained which dyes acetate artificial silk red-brown shades.

*Example 4*

A mixture of 253 parts of 1,2,4-triaminoanthraquinone, 400 parts of 1-chlorbutyrone(3) and 1500 parts of pyridine is heated to boiling for 10 hours. In this way 1,2,4,-tri-(gamma-ketobutylamino)-anthraquinone is obtained which dyes acetate artificial silk blue shades.

*Example 5*

A mixture of 268 parts of 1,4,5,8-tetraminoanthraquinone, 500 parts of 1-chlorbutyrone(3) and 2000 parts of pyridine is heated to boiling for 15 hours. After working up, 1,4,5,8-tetra-(gamma-ketobutylamino)-anthraquinone is obtained.

By acting with two molecular proportions of 1-chlorbutyrone(3) or 1 molecular proportion of tetraminoanthraquinone, a 1,4,5,8-diamino-di-gamma-ketobutylaminoanthraquinone is obtained.

1-amino-4-methylaminoanthraquinone, 1,4-nitroaminoanthraquinone, 1-benzoylamino-4-aminoanthraquinone, 1-benzoylamino-5-aminoanthraquinone, 1-amino-4-methoxyanthraquinone, 4-amino-1,2-ortho-chlorphenylanthrimidazole, Bzl-aminobenzanthrone or 4-amino-1,9-anthrapyridine may also be used instead of 1,4,5,8-tetraminoanthraquinone.

*Example 6*

A mixture of 238 parts of 1,2-diaminoanthraquinone, 1000 parts of alcohol, 200 parts of vinyl methyl ketone and 10 parts of hydroquinone is heated at 150° C. for 15 hours in a pressure-tight vessel. After cooling, the crystalline 1,2-di-(gamma-ketobutylamino)-anthraquinone formed is filtered off by suction. It dyes acetate artificial silk rose shades.

If 1,8-diaminoanthraquinone be used instead of 1,2-diaminoanthraquinone, a dyestuff is obtained which dyes acetate artificial silk bluish red shades.

*Example 7*

A mixture of 239 parts of 1-amino-4-hydroxyanthraquinone, 100 parts of vinyl methyl ketone and 2000 parts of pyridine is heated to boiling for 15 hours while stirring vigorously. The 1-gamma-ketobutylamino-4-hydroxyanthraquinone formed separates upon cooling. It dyes acetate artificial silk red-violet shades.

*Example 8*

320 parts of 1-chlorbutyrone(3) are dropped into a boiling solution of 238 parts of 1,5-diaminoanthraquinone in 2000 parts of ortho-dichlorbenzene while stirring vigorously, the whole then being heated for 10 hours. After cooling, the resulting dark compound separates out. After purification, red-brown needles are obtained which melt at about 344° C. The compound probably has the following constitution:

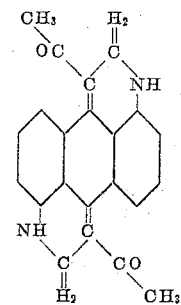

*Example 9*

250 parts of ice and about 2 parts of mercury sulphate are added to a solution of 24 parts of 1,4-diaminoanthraquinone in 200 parts of concentrated sulphuric acid and 21 parts of vinylacetylene are led in at from 30° to 35° C. The initially red-brown suspension changes into a red-violet solution. After heating for another hour at from about 50° to 60° C. the mixture is poured into water. The di-gamma-ketobutyl-aminoanthraquinone formed thus separates. After crystallization from alcohol, brilliant blue-violet needles having a melting point of 174° C. are obtained.

Instead of starting from 1, 4-diaminoanthraquinone, leuco-1, 4-diaminoanthraquinone may be used if it be oxidized in concentrated sulphuric acid, for example by leading in chlorine, into 1, 4-diaminoanthraquinone, the resulting solution then being worked up as already described.

1-aminoanthraquinone, 1, 2, 4-triaminoanthraquinone, 1, 4, 5, 8-tetraminoanthraquinone, 1-amino-4-methylaminoanthraquinone, 1, 4-nitroaminoanthraquinone, 1-amino-4-hydroxyanthraquinone, 1-amino-4-methoxyanthraquinone or Bzl-aminobenzanthrone may be reacted with vinylacetylene in a manner similar to 1, 4-diaminoanthraquinone.

Example 10

15 parts of acrolein are dropped at 80° C. into a solution of 23.8 parts of 1, 4-diaminoanthraquinone in 300 parts of butanol, the mixture being stirred for 16 hours at 100° C. Dark colored crystals thus separate. They are filtered off by suction, whereby 38 parts of a compound are obtained which probably has the following constitution:

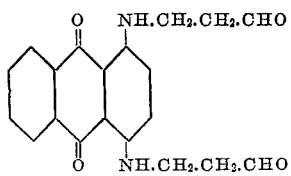

By treating with ring-closing agents, such as zinc chloride or concentrated sulphuric acid, it may be converted into the corresponding anthrapyridone which probably has the following constitution:

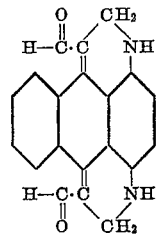

Example 11

A mixture of 262 parts of 1, 4, 5, 8-tetraminoanthraquinone, 3000 parts of alcohol, 130 parts of acrolein and 0.5 part of hydroquinone is heated to boiling for 5 hours and worked up as described in Example 1. There are thus obtained 450 parts of a compound which forms dark lustrous crystals which dissolve in organic solvents giving a blue coloration.

By using twice the amount of acrolein, there is obtained in a yield of 520 parts a much more greenish final product.

Example 12

238 parts of 1,4-diaminoanthraquinone are dissolved in 2500 parts of 96 per cent sulphuric acid while stirring. 600 parts of ice are introduced into the said solution, whereby the red-brown sulphate of 1, 4-diaminoanthraquinone separates. Into this suspension there are dropped 175 parts of vinyl methyl ketone, whereby the solution becomes a powerful red-violet color. It is heated for a short time at from 45° to 50° C. By the addition of water, the 1, 4-di-gamma-ketobutyl-aminoanthraquinone is precipitated in the form of blue-black needles which may be isolated by filtration by suction.

Example 13

238 parts of 1, 4-diaminoanthraquinone are reacted with 200 parts of acrylic acid in the manner described in Example 3. The dyestuff, separated in the usual manner, dissolves in ammonia giving a deep blue coloration.

Example 14

A solution of 238 parts of 1, 4-diaminoanthraquinone in 1000 parts of concentrated sulphuric acid is mixed with about 3000 parts of ice and, after the separation of 1, 4-diaminoanthraquinone sulphate, with a mixture of 100 parts of epichlorhydrine and 80 parts of vinylmethylketone.

After heating the mixture for a short time at from 40° to 70° C. the dyestuff is precipitated by means of ice-cold water; it forms a blue powder which dyes acetate artificial silk reddish blue shades and has the following constitution:

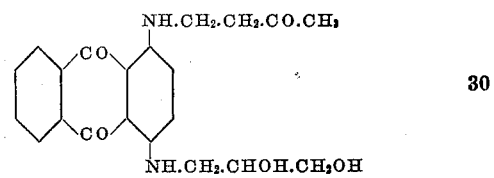

Example 15

253 parts of 1-amino-4-methoxyanthraquinone are made up with 140 parts of vinylmethylketone and then mixed with 1300 parts of water and 25 parts of concentrated sulphuric acid. After heating for a short time the dyestuff is precipitated by the addition of about 1000 parts of water and isolated in the usual manner, for example by filtration. It crystallizes in the form of red-brown needles and dyes acetate artificial silk bluish red (ruby) shades. It has the following constitution:

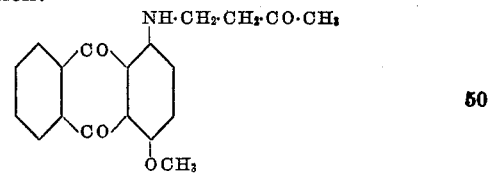

Example 16

50 parts of 1,4-diaminoanthraquinone are dissolved in 200 parts of 50 per cent alcohol and, 49 parts of phenylvinylketone and 6.5 parts of 30 per cent hydrochloric acid having been added, heated at from 40° to 80° C. for about 2–3 hours. After cooling the dyestuff crystallized in the form of short pale blue needles is filtered off by suction. It dyes acetate artificial silk blue-violet shades and probably has the following constitution:

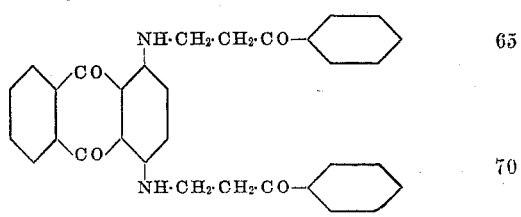

Other dyestuffs obtainable when treating different aminoanthraquinones and vinylmethylketone according to the manner described in the foregoing examples are to be seen from the list below:

| Vinylmethylketone is reacted with— | Shade on acetate artificial silk |
|---|---|
| 1-aminoanthraquinone | Scarlet-red. |
| 1-amino-2-hydroxyanthraquinone | Bluish red. |
| 1-amino-4-hydroxyanthraquinone | Blue-red. |
| 1,5-diamino-4-hydroxyanthraquinone | Blue |
| 1,5-diamino-4,8-dihydroxyanthraquinone | Do |
| 1-amino-4-nitroanthraquinone | Blue-violet. |
| 1,4-diamino-5-nitroanthraquinone | Navy-blue. |
| 1,4-diamino-3-methoxyanthraquinone | Violet. |
| 1-amino-4-methylaminoanthraquinone | Greenish blue. |
| 1,2-diaminoanthraquinone | Red. |
| 1,5-diaminoanthraquinone | Rose. |
| 1,8-diaminoanthraquinone | Violet-red. |
| 1,2,4-triaminoanthraquinone | Blue-violet. |
| 1,4,5,8-tetraminoanthraquinone | Greenish blue |
| 1-amino-4-ethanolaminoanthraquinone | Dark blue. |
| 1,5-diamino-2,4,6,8-tetrachloranthraquinone | Rose. |
| 1-amino-4-benzoylaminoanthraquinone | Blue-violet. |
| 1-amino-5-benzoylaminoanthraquinone | Rose. |
| 1-amino-4-chloranthraquinone | Pale red. |
| 1-amino-5-chloranthraquinone | Red. |
| Bzl-aminobenzanthrone | Dark red. |
| 5-amino-1,9-anthrapyrimidine | Bordeaux red. |
| 4-amino-1,9-pyrazoloanthrone | Dark red. |

What we claim is:

1. A compound of the anthraquinone series having at least one group $—NH—C_2H_4—CO—X$, X being a radical selected from the class consisting of hydrogen and the alkyl and mononuclear unsubstituted aryl groups.

2. A compound of the anthraquinone series having at least one group $—NH—C_2H_4—CO—$alkyl.

3. Di-gamma-ketobutylaminoanthraquinone.

4. 1-gamma-ketobutylamino-4-methoxyanthraquinone.

5. 1,4,5,8-diamino-di-gamma-ketobutylaminoanthraquinone.

HEINRICH HOPFF.
HELMUT EICHEL.
ADOLF DIEBOLD.